United States Patent
Bhikkaji et al.

(10) Patent No.: US 9,515,872 B2
(45) Date of Patent: Dec. 6, 2016

(54) SYSTEMS AND METHODS FOR TUNNEL-FREE FAST REROUTING IN INTERNET PROTOCOL NETWORKS

(71) Applicant: Dell Products L.P., Round Rock, TX (US)

(72) Inventors: Bhargav Bhikkaji, San Jose, CA (US); Balaji Venkat Venkataswami, Tamilnadu (IN)

(73) Assignee: DELL PRODUCTS L.P., Round Rock, TX (US)

( * ) Notice: Subject to any disclaimer, the term of this patent is extended or adjusted under 35 U.S.C. 154(b) by 196 days.

(21) Appl. No.: 13/797,474

(22) Filed: Mar. 12, 2013

(65) Prior Publication Data

US 2014/0269250 A1    Sep. 18, 2014

(51) Int. Cl.
*H04L 12/24* (2006.01)
*H04L 12/725* (2013.01)
*H04L 12/703* (2013.01)

(52) U.S. Cl.
CPC ......... *H04L 41/0668* (2013.01); *H04L 45/308* (2013.01); *H04L 45/28* (2013.01)

(58) Field of Classification Search
USPC .................................. 370/216–228, 351–430
See application file for complete search history.

(56) References Cited

U.S. PATENT DOCUMENTS

| | | | |
|---|---|---|---|
| 7,830,787 B1* | 11/2010 | Wijnands et al. | 370/218 |
| 8,792,388 B2* | 7/2014 | Yamato et al. | 370/255 |
| 2008/0049622 A1* | 2/2008 | Previdi et al. | 370/237 |
| 2008/0080517 A1* | 4/2008 | Roy et al. | 370/395.5 |
| 2014/0146674 A1* | 5/2014 | Wang et al. | 370/235 |

* cited by examiner

*Primary Examiner* — Awet Haile
*Assistant Examiner* — Kent Krueger
(74) *Attorney, Agent, or Firm* — Haynes and Boone, LLP

(57) ABSTRACT

An information handling system is provided. The information handling system includes a first, a second, a third, and a fourth network device. The first network device is coupled to the second network device and to the third network device, while the fourth network device is also coupled to the second and third network devices. At least the fourth network device has a plurality of interfaces and one or more processors in communication with the interfaces and a memory. At least one of the one or more processors is configured to disassociate a network address of the first network device from a first VRF instance and associate the network address of the first network device with a second VRF instance when a network failure associated with the first VRF instance is detected. Methods for rerouting traffic through the information handling system in response to a network event are also disclosed.

19 Claims, 5 Drawing Sheets

SYSTEMS AND METHODS FOR TUNNEL-FREE FAST REROUTING IN INTERNET PROTOCOL NETWORKS

BACKGROUND

1. Technical Field

The present disclosure is related to information handling systems. In particular, embodiments of information handling systems disclosed herein are related to data center implementation and management.

2. Discussion of Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Currently, there is increasing demand and use of data centers to provide businesses and consumers with access to vast amounts of data and services. To implement these data centers requires large numbers of switches, routers, and other network devices, connected together through even larger numbers of links. Inevitably, a link or a network device in the data center may fail. Many techniques have been developed to handle such network events promptly to permit seamless operation to continue. However, such implementations have not been entirely satisfactory.

SUMMARY

Consistent with some embodiments, there is provided an information handling device. The information handling device includes a plurality of interfaces, a memory, and one or more processors. The memory stores a first routing table associated with a first virtual routing and forwarding (VRF) instance and a second routing table associated with a second VRF instance. The one or more processors are in communication with the plurality of interfaces and the memory, and at least one of the one or more processors is configured to disassociate a network address from the first VRF instance and to associate the network address with the second VRF instance when a network event is detected.

Consistent with some embodiments, there is further provided an information handling system. The information handling system includes a first network device that is coupled to a second network device and to a third network device and also includes a fourth network device that is coupled to the second network device and the third network device. This fourth network device includes a plurality of interfaces and one or more processors in communication with the plurality of interfaces and a memory. At least one of the one or more processors is configured to disassociate a network address of the first network device from a first VRF instance and to associate the network address of the first network device with a second VRF instance when a network failure associated with the first VRF instance is detected.

Consistent with some embodiments, there is further provided a method for rerouting network traffic through an information handling system in response to a network event. The method include steps of determining a reroute path in anticipation of the network event, communicating the reroute path to a network device, and detecting the network event adjacent to the network device along a normal-condition path through the information handling system. The method further includes associating one or more network addresses directing traffic along the normal-condition path with a virtual routing and forwarding (VRF) instance in response to the network event. This VRF instance directs traffic along the reroute path thereafter.

These and other embodiments will be described in further detail below with respect to the following figures.

Figure 1A:
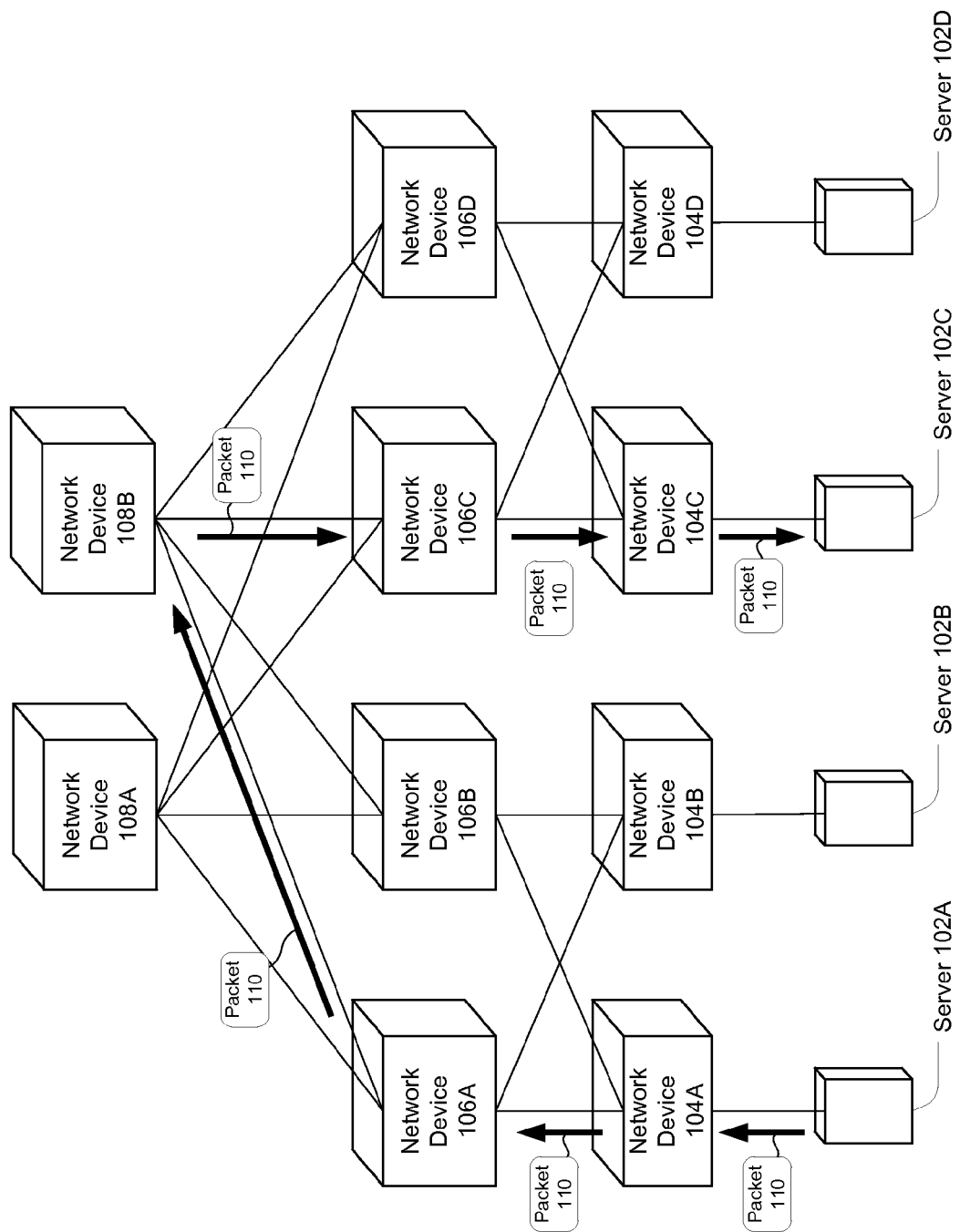
FIG. 1A is a diagram of an information handling system with a plurality of coupled network devices.

For clarity of discussion, elements having the same designation in the drawings may have the same or similar functions. The drawings may be better understood by referring to the following Detailed Description.

DETAILED DESCRIPTION

In the following description specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is within the scope and spirit of this disclosure.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processors or processing resources such as a central processing unit (CPU) or hardware or software control logic, ROM, and/or other types of nonvolatile memory. Additional components of the information handling system may include one or more disk drives, one or more network interfaces for communicating with external devices as well as various input and output (I/O) devices, such as a keyboard, a mouse, and a video display. The information handling system may also include one or more buses operable to transmit communications between the various hardware components.

Additionally, some embodiments of information handling systems include non-transient, machine-readable media that include executable code that when run by a processor, may cause the processor to perform the steps of methods described herein. Some common forms of machine-readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

FIG. 1A depicts an information handling system 100 that includes a plurality of coupled network devices. As depicted, information handling system 100 is configured in a number of tiers, levels, or stages of network devices to form a data center. On the bottom a plurality of servers 102A, 102B, 102C, and 102D are coupled, respectively to a first level of network devices 104A, 104B, 104C, and 104D. As depicted, the servers 102A-D are single servers, but in other embodiments each of servers 102A-D is a plurality of server and/or host devices. In such embodiments, network devices 104A-D may be top-of-rack (TOR) devices.

In turn, each of network devices 104A-D is coupled, as depicted, to two of a second tier or level of network devices, including network devices 106A-D. Network devices 106A-D are coupled to the network devices 104A-D below in the topology and to network devices 108A and 108B above. As depicted, the network devices 104A-D, 106A-D, and 108A-D are routers coupled by links and communicating by an Internet Protocol (IP), such as Internet Protocol Version 4 (IPv4) or Internet Protocol Version 6 (IPv6).

As illustrated, FIG. 1A depicts a packet 110 being transmitted from server 102A to server 102C. Server 102A prepares the packet for transmission by applying an appropriate header, in this case an IP header that includes an IP source address corresponding to server 102A and an IP destination address corresponding to server 102C. The packet 110 is sent from server 102A first to the network devices 104A. This is the first hop in the path from server 102A to server 102C. Under normal conditions, each of the network devices in information handling system 100 operates as designed, there are no link failures, no node failures, and no additions or removals of network devices from the system. The normal-condition path of packet 110 is depicted in solid-lined arrows from network device 104A up to network device 106A, up to network device 108B, down to network device 106C, down to network device 104C, and finally to server 102C. While other normal-condition paths may be used in various embodiments or at various times in a single embodiment, the normal-condition path is useful for explanation.

Figure 1B:
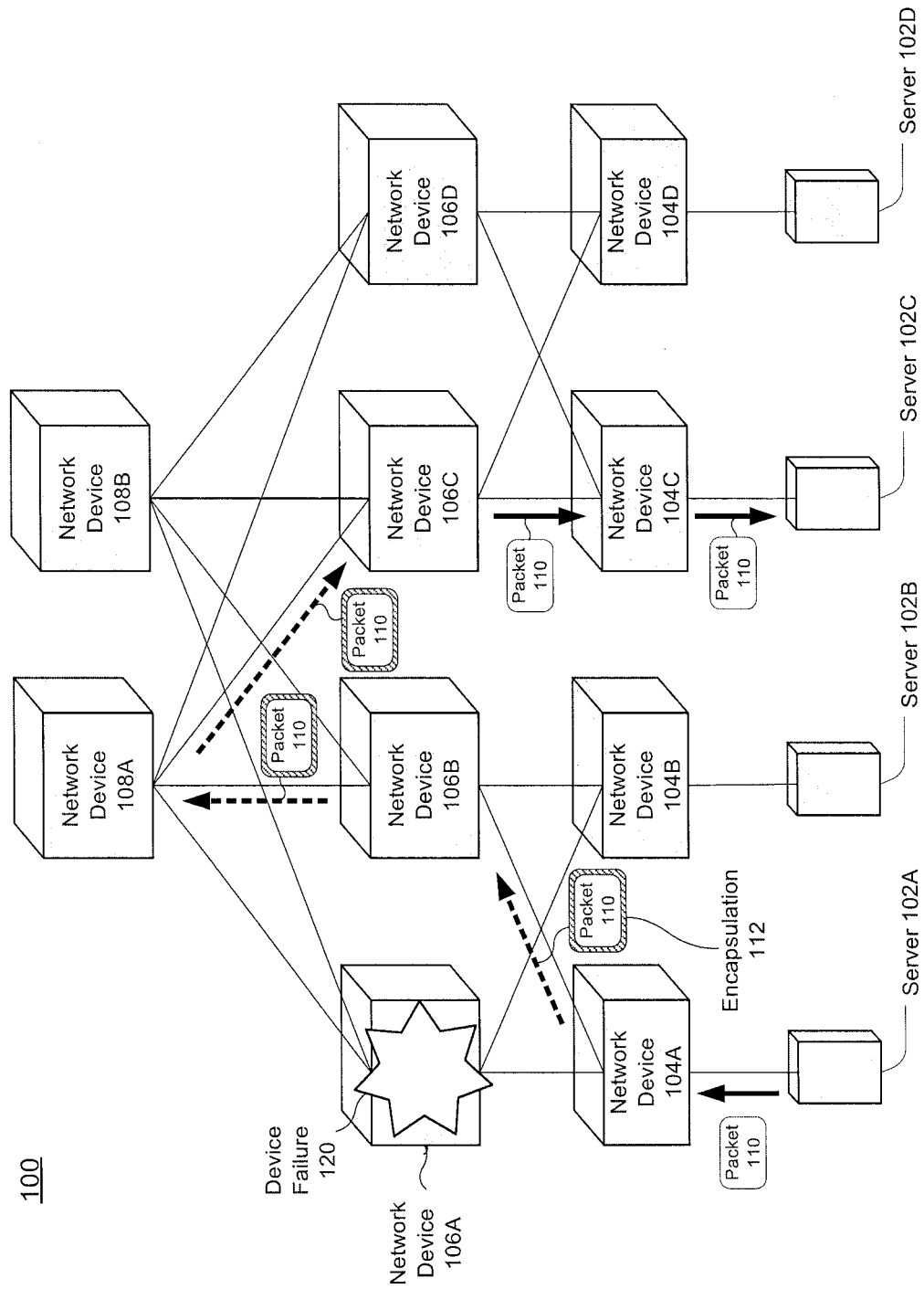
FIG. 1B is a diagram of an information handling system responding to minimize the effects of a device failure.

FIG. 1B depicts information handling system 100 with a device failure 120 occurring on the network device 106A. The device failure 120 may have a wide variety of causes, but generally prevents the network device 106A from being able to transmit packets, such as packet 110 up to network device 108B. Information handling system 100 has a fast reroute implementation. In response to the device failure 120 on network device 106A and when the network device 104A learns of the device failure 120, network device 104A acts as a point of local repair (PLR) and begins sending packets on a fast reroute tunnel. The fast reroute tunnel is depicted in the dashed-line arrows.

As illustrated, the fast reroute tunnel is created by encapsulating the packet 110 with an encapsulation 112. The encapsulation 112 may be an IP-in-IP encapsulation, generic routing encapsulation, or another encapsulation or tunneling protocol. Through the use of encapsulation 112, the packet 110 can be assigned a different next hop destination. As seen in FIG. 1B, due to the encapsulation 112 packet 110 goes to network device 106B rather than 106A in its next hop. The fast reroute tunnel, by use of encapsulation 112, directs the packet 110 away from the device failure 120, to network device 108A and then to network device 106C.

As depicted in FIGS. 1A and 1B, network device 106C is part of the normal-condition path (solid-line arrows of FIG. 1A) as well as the fast reroute path (dashed-line arrows of FIG. 1B). Network device 106C is considered to be the merge point, as the fast reroute path effectively terminates into the normal-condition path at this device.

In information handling system 100 as depicted in FIGS. 1A and 1B, the system or network in this example, relies on encapsulation to rapidly alter and adjust data paths in response to the device failure 120. In other embodiments, other network events, such as link failures, node failures, additions, and/or removals of network devices, may trigger the use of the encapsulation 112 to continue the flow of packets. In some networks a delay of a second between a failure and a repair or reroute may be permissible. However, many applications, such as VoIP, video conferencing, and others, would be unsatisfactory with a delay of a second and may require recovery in about 50 milliseconds. While the use of encapsulation may meet such a requirement, encapsulation itself introduces a delay, wasting time and overhead.

Figure 2:
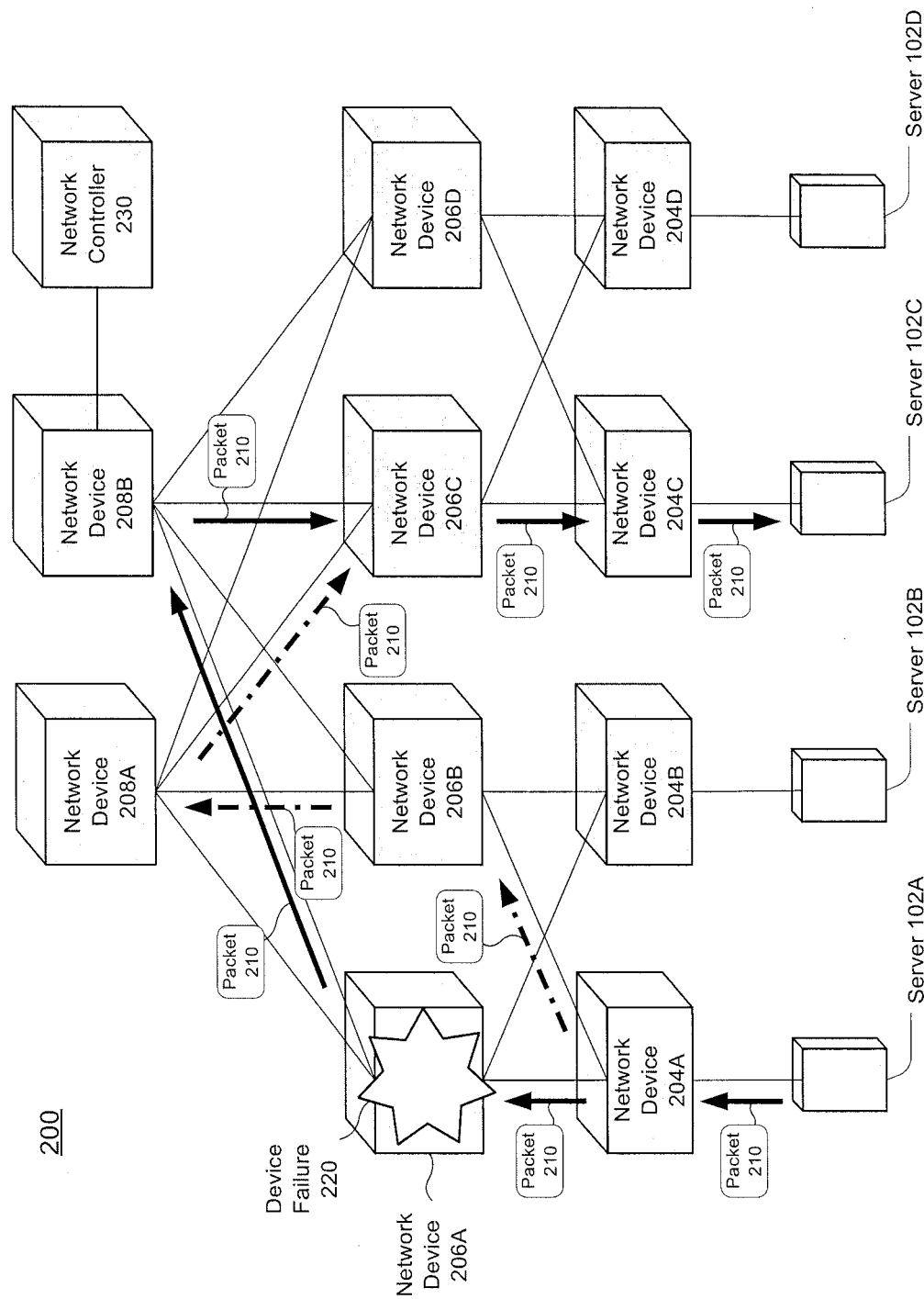
FIG. 2 is a diagram of an information handling system responding to minimize the effects of a device failure according to an embodiment.

FIG. 2 illustrates an information handling system 200, which is similar in many respects to the information handling system 100 as seen in FIG. 1A. Information handling system 200 includes a plurality of servers, including servers 102A-D and a plurality of network devices 204A-D, 206A-D, and 208A-B coupled together in a hierarchical network configuration as depicted. As depicted, the network devices 208A and 208B function as spine devices, while network devices 206A-D function as leaf devices, with each network device being connected to at least two other network devices. Further, in the depicted embodiment, each of the plurality of network devices is an IP router, though other embodiments may be other kinds and/or combinations of network devices operating according to other protocols.

FIG. 2 also depicts a normal-condition path in solid-line arrows and a reroute path in dash-dotted-line arrows. When a packet 210 from server 102A is to be transmitted to server 102C under normal conditions the packet 210 is transmitted first to network devices 204A, then up to network device 206A, and up to network device 208B. From network device 208B, the packet 210 travels down to network device 206C, then down to network device 204C, and finally to server 102C. However, certain network events may necessitate a departure from the normal-condition path.

For example, FIG. 2 depicts a device failure 220 occurring on network device 206A. After network device 204A detects the device failure 220, packets like packet 210 are rerouted. Assuming that the device failure 220 is detected before packet 210 is to be transmitted by network device 204A, network device 204A reroutes the packet 210 from the normal-condition path to the reroute path. As depicted, the reroute path connects network device 204A up to network device 206B, which in turn is connected up to network device 208A. From network device 208A the reroute path is connected down to network device 206C, which is the merge point for the reroute path, the point at which the reroute path rejoins the normal-condition path. The packet is then transmitted along the normal-condition path to its destination, server 102C. Unlike as depicted in FIG. 1B, the packet 210 is not encapsulated in order to be sent on the reroute path.

Before a network event, like device failure 220, is detected a plurality of reroute paths may be determined. As depicted, information handling system 200 also includes a network controller 230. While depicted as coupled to network device 208B, a network controller 230 communicates with the network devices of information handling system 200 in order to determine the topology of the system. Network controller stores a representation of that topology in memory and further uses it to calculate a plurality of fast reroute paths, with one such path being depicted in the dash-dotted-line arrows. These fast reroute paths may then be distributed to the network devices, which store the reroute paths in local memory for use in the event of a network event. In the depicted embodiment, network controller 230 is an OpenFlow controller, and each of the network devices is configured to provide an OpenFlow agent. The OpenFlow controller computes the reroute paths and pushes the reroute paths to the OpenFlow agents running on each of the network devices depicted as part of information handling system 200.

In the depicted embodiment, the device failure 220 is detected by network device 204A, which supports the bidirectional forwarding detection (BFD) protocol. Thus, the network device 204A may detect failures on neighboring network devices (here, network devices 206A and 206B) and on the links coupling it to those devices. When a network event like device failure 220 is detect, the network device 204A applies one or more policy-based routing (PBR) rules. In the depicted embodiment, the PBR rules to be applied by network device 204A in such a situation are generated by network controller 230 and then distributed to the OpenFlow agents on each of the network devices, including network device 204A. The PBR rules may permit routing by packet size, source address, protocol type, destination address, and other criteria.

At least one of the PBR rules indicates that at least some of the traffic that would have passed through network device 204A should be associated with a particular virtual routing and forwarding (VRF) instance. This particular VRF instance can be considered a reroute VRF instance as it is used to provide fast reroute path in response to a network event. The reroute VRF instance has a dedicated, separate routing table, referred to as a forwarding information base or a forwarding table. A number of VRF instances may be in operation on network device 204A and on the other network devices of information handling system 200. Network device 204A may also receive packet 210 from server 102A as on another VRF instance. The forwarding table of the other VRF instance directs packet 210 up to network device 206A, so when the device failure 220 is detected, network device 204A associates the destination address of packet 210, at least temporarily, with the reroute VRF instance instead.

When activated, a content-aware forwarding processor rule may direct that a packet with a particular network address represented by a subnet and/or corresponding prefix designated in the rule should be forwarded to a specific forwarding VRF instance. The content-aware forwarding processor rules are applied as soon as the packet in that subnet being re-routed enters the packet forwarding engine. The rule could be based on destination address, or source and destination address, or other details such as the source interface and destination interface. During a triggering network event, the PBR rule for the forwarding VRF instance then picks up the packet and reroutes the packet according to the PBR rule.

In some embodiments, rather than reroute according to a single destination address, the PBR rules direct that a set of prefixes be associated with the reroute VRF instance to reroute the associated traffic. This change in VRF instance association may be performed locally on the network device in about 50 milliseconds. In some embodiments, all the network devices in between the PLR (here, network device 204A) and the merge point (here, network device 204C) may apply PBR rules to associate the packet or prefixes to a local reroute VRF instance, based on the content-aware forwarding processor rules. In other embodiments, once the reroute VRF instance has been associated, the application of PBR rules on these intermediate network devices is adequate to maintain the diverted traffic on the reroute path. The PBR rules may be applied on the interface, such that the interface and VLAN on which a packet is received would indicate on which VRF instance the packet is received. Once packet 210 arrives at network device 206C, the merge point, the packet 210 is disassociated from the reroute VRF instance.

Figure 3:
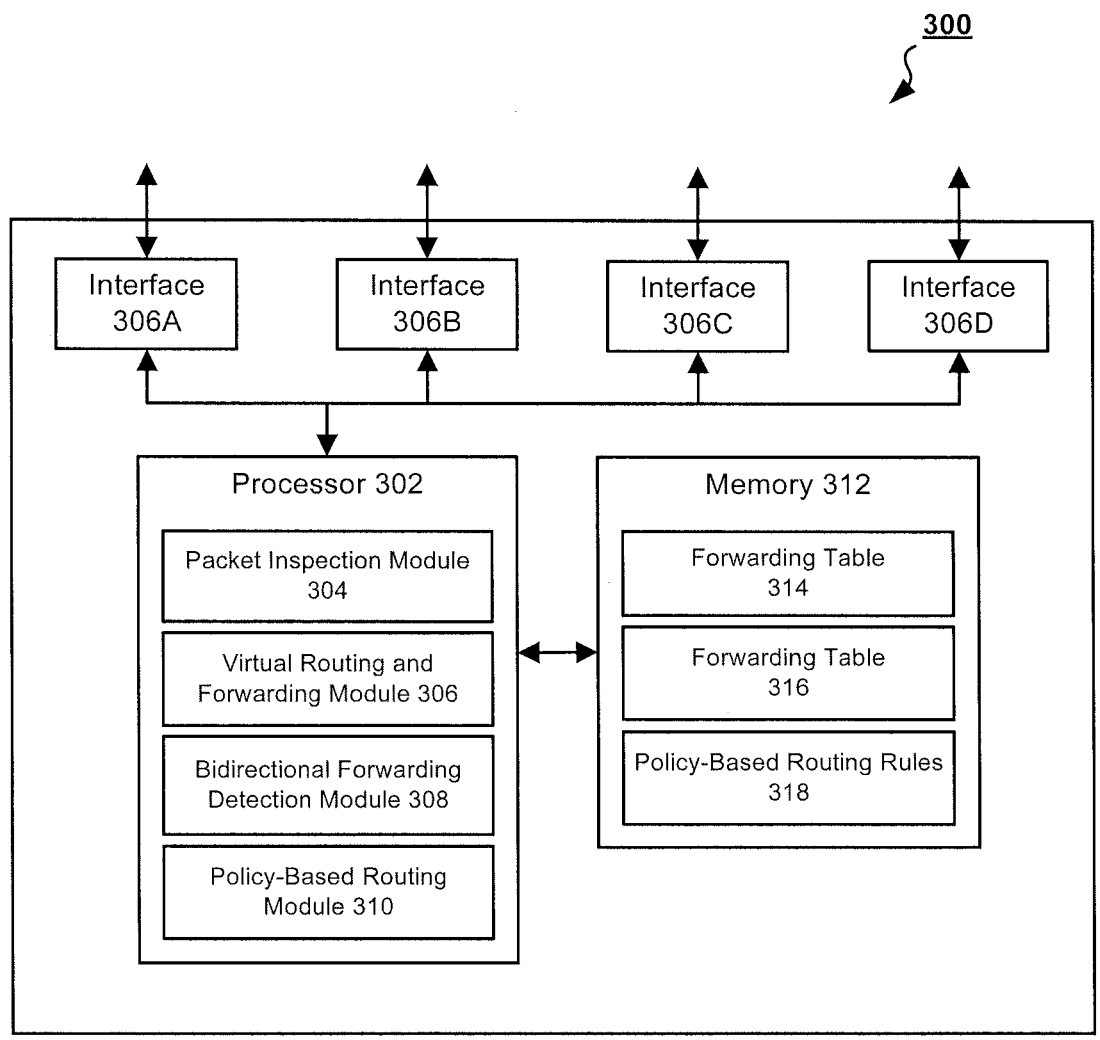
FIG. 3 is a diagram of an information handling device that is used to minimize the effects of a network event according to an embodiment of the present invention.

FIG. 3 depicts an information handling device 300, such as may be used for network device 204A and/or the other network devices of FIG. 2. Information handling device 300, or network device 300, includes one or more processors, like processor 302. Processor 302 may include network processing units and/or central processing units. Working in conjunction with software stored in memory 312, or by implementation of application specific integrated circuits (ASICs), processor 302 provides a plurality of modules. As depicted, processor 302 provides a packet inspection module 304 that may be used to extract information from a received packet, such as destination and source addresses contained in the header of the packet. Processor 302 also provides a virtual routing and forwarding (VRF) module 306. The VRF module 306 associates and identifies associations between destination addresses and/or prefixes, storing the associations in a forwarding table, with one forwarding table being maintained for each VRF instance operating on the network device 300.

Processor 302 of network device 300 also provides a bidirectional forwarding detection module 308 for monitoring the operational status of neighboring network devices. Other embodiments of network device 300 may include other network event detection modules instead of, or in addition to, bidirectional forwarding detection (BFD) module 308. Also depicted, processor 302 provides a policy-based routing module 310 that is configured to apply one or more PBR rules received from a network controller.

Network device 300 includes a memory 312. Memory 312 may be a plurality of individual memory modules and types of memory. For example, memory 312 may include ROM, RAM, CAM, and/or other types of memory. As depicted, memory 312 has a forwarding table 314 and a forwarding table 316 stored therein. Forwarding tables 314 and 316 are associated with two separate VRF instances. Thus, as depicted network device 300 is configured to support two VRF instances. However, many embodiments of network device 300 support many more VRF instances. But at least one of the VRF instances with a forwarding table stored in memory 312 on network device 300 is a reroute VRF instance. Other embodiments of network device 300 are configured to support more than one reroute VRF instance.

When a packet is received on one of interfaces 306A, 306B, 306C, and 306D, VRF module 306 determines which VRF instance to send the packet out on by search for the destination address of the packet in forwarding tables 314 and 316. As discussed above, in response to a network event detected by the BFD module 308, the PBR module 310 applies a rule that causes VRF module 306 to associate a destination address, a prefix, or a set of prefixes to a reroute VRF instance by including them in the forwarding table of the reroute VRF instance. The PBR module 310 applies policy-based routing rules 318, depicted in FIG. 3 as being stored in memory 312. As discussed, in embodiments in which network device 300 includes an OpenFlow agent, the PBR rules 318 may be received from a coupled OpenFlow controller.

As discussed, one or more of the module depicted as being provided by processor 302 may be provided in various configurations. For example, in one embodiment, the depicted modules are provided by instructions stored in memory 312 and being executed by processor 302, in another, each module is an ASIC, and in yet another, each module is a combination of hardware and software.

Figure 4:
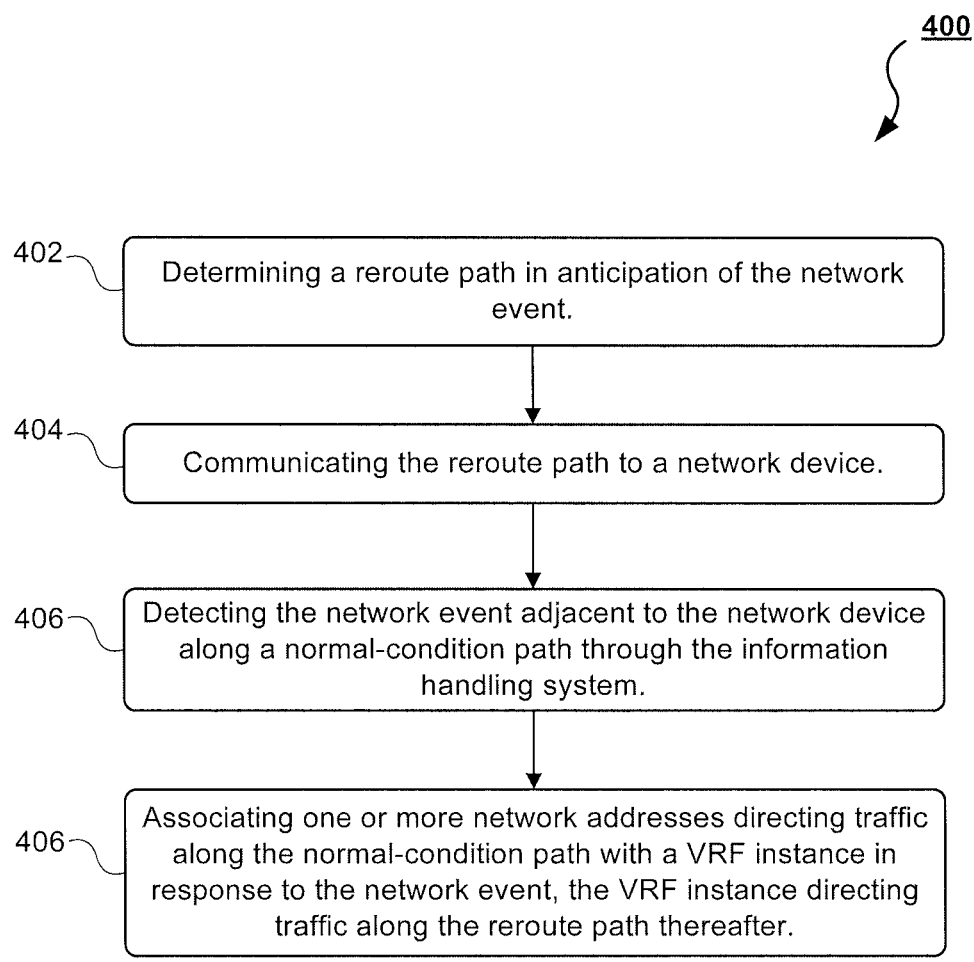
FIG. 4 is a flowchart of a method for rerouting network traffic through an information handling system in response to a network event.

FIG. 4 is a flowchart of a method 400 for rerouting network traffic through an information handling system in response to a network event. As depicted, method 400 includes a plurality of steps. Embodiments of method 400 may include additional steps before, after, and in between the depicted steps. Method 400 begins in step 402 when a reroute path is determined in anticipation of a network event. In step 404, the reroute path is communicated to at least one network device. The network device detects a network event, such as a link or node failure, adjacent to the network device, in step 406. Prior to the network event, traffic flowed along a normal-condition path through the information handling system. In step 408, one or more network addresses that previously directed traffic along the normal-condition path are associated with a VRF instance that directs the traffic along the reroute path instead.

Reference may be made to information handling system 200 of FIG. 2 and network device 300 of FIG. 3 to more clearly explain how method 400 may be performed. For example, a network controller 230, which may be an Open-Flow network controller, collects topology information from an OpenFlow agents running on each of the network devices of information handling system 200. The network controller 230 uses this topology information and other information to calculate a reroute path in anticipation of a device failure 220 occurring on network device 204A (step 402). The network controller 230 also formulates a PBR rule to direct network device 204A to associate certain network device with a reroute VRF instance if the device failure 220 occurs. The reroute path and the PBR rule are transmitted or pushed to network device 300 (step 404). Consistent with some embodiments, the reroute path and the PBR rule are transmitted or pushed to an OpenFlow agent on network device 300.

When the device failure 220 occurs, a BFD module 308 included in network device 204A detects the failure (step 406). A PBR module 310 applies the PBR rule, stored in PBR rules 318 in memory 312 and formulated earlier by network controller 230. The application of the PBR rule directs the VRF module 306 to associate a destination address, a prefix, or a set of prefixes with a reroute VRF instance by making an entry in forwarding table 314 (step 408). Thereafter, when a packet is received on the network device 204A, the inspection module 304 inspects incoming packets to determine their destination address and what VRF instance the packets are received on, the VRF module 306 ensures transmission of the packet on an interface as indicated by forwarding table 314.

In an additional embodiment, network device 204A detects the failure (step 406). Then in response to the failure, network device 204A acting as the PLR associated a prefix, or subnet, along with its other tuple characteristics to the reroute VRF instance. A PBR rule operating for the reroute VRF instance directs the packet to the next devices in the reroute path, network device 206B. Network device 206B has PBR rules operating that direct the packet, when received on a particular interface or based on the interface and a VLAN associated with the reroute VRF instance, to be directed to the next device in the reroute path, network device 208A. This redirection or rerouting may continue until the packet or traffic reaches the merge point, after which the normal-condition path is resumed until the destination.

Sometime later, the device failure 220 may end such that transmission along the normal-condition path may be resumed. BFD module 308 may detect the end of the device failure 220 or other network event. PBR module 310 may then apply another PBR rule to disassociate the network address, prefix, or set of prefixes from the reroute VRF instance and to return the traffic to the normal-condition path. The application of the PBR rule may be effected by the VRF module 306 through changing the entries recorded in forwarding table 314 and 316 to alter the interfaces through which the traffic leaves. By altering the interfaces, the next hop directs the traffic to network device 306A rather than to network device 306B, which was part of the reroute path. In some embodiments, the PBR rules that direct the associated of the traffic to be redirected along the reroute path is transmitted to all network devices along the reroute path as determined by network controller 230. In such embodiments, each network device may apply the PBR rule or rules maintain the association with the reroute VRF instance until traffic reaches the merge point.

As the merge point, network device 206C, the packet inspection module 304 may determine the destination address and the VRF on which traffic is received. When traffic is received with a destination address of server 102C and on the reroute VRF instance, the traffic may be reassigned by VRF module 306 to a VRF instance associated with the normal-condition path in order to merge the traffic. The reassignment may be performed according to a PBR rule enforced by the PBR module 310 of network device 206C.

Some embodiments of information handling systems 100, 200 and information handling device 300 include tangible, non-transient, machine-readable media that include executable code that when run by a processor, such as computer processor 302 of network device 300 in FIG. 3, may cause the processor to perform the steps of method 400 as described above. Some common forms of machine-readable media that may include the steps of method 400 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/ or any other medium from which a processor or computer is adapted to read. The machine-readable media may be memory 312 of FIG. 3.

The examples provided above are exemplary only and are not intended to be limiting. One skilled in the art may readily devise other systems consistent with the disclosed embodiments which are intended to be within the scope of this disclosure. As such, the application is limited only by the following claims.

What is claimed is:

1. An information handling device comprising:
   a plurality of interfaces; and
   a memory including a first routing table, the first routing table being associated with a first virtual routing and forwarding (VRF) instance, the first VRF instance providing a normal-condition path associated with a network address; and
   one or more processors in communication with the plurality of interfaces and the memory, wherein the one or more processors are configured to:
   receive, from a network controller and prior to a network failure being detected, a reroute path associated with the network address and a policy-based routing rule indicating that the traffic corresponding to the network address should be associated with a second VRF instance, wherein the network controller is an OpenFlow controller and the reroute path and the policy-based routing rule are received according to an OpenFlow protocol;
   store the reroute path in the memory using a second routing table, the second routing table being associated with the second VRF instance;
   and disassociate the network address from the first VRF instance and associate the network address with the second VRF instance when the network failure is detected.

2. The information handling device of claim 1, wherein disassociating the network address from the first VRF instance and associating the network address with the second VRF instance comprises:
   applying the policy-based routing rule.

3. The information handling device of claim 1, further comprising an OpenFlow agent provided by the one or more processors, the OpenFlow agent being in communication with the OpenFlow controller.

4. The information handling device of claim 2, wherein the policy-based routing rule is applied using a policy-based routing module.

5. The information handling device of claim 1, further comprising at least one additional routing table being maintained in the memory.

6. The information handling device of claim 1, further comprising a bidirectional forwarding detection module being provided by the one or more processors, the bidirectional forwarding detection module configured to identify the network failure between the information handling device and an additional information handling device coupled to the information handling device through at least one of the plurality of interfaces.

7. The information handling device of claim 1, wherein the network failure is a failure of a link or a failure of a node.

8. An information handling system comprising:
   a first network device that is coupled to a second network device and to a third network device,
   a fourth network device that is coupled to the second network device and the third network device, wherein the fourth network device comprises:
   a plurality of interfaces;
   a memory including a first routing table, the first routing table being associated with a first virtual routing and forwarding (VRF) instance, the first VRF instance providing a normal-condition path associated with a network address of the first network device; and
   one or more processors in communication with the plurality of interfaces and the memory, wherein the one or more processors are configured to:
   receive, from a network controller and prior to a network failure associated with the first VRF instance being detected, a reroute path associated with the network address and a policy-based routing rule indicating that the traffic corresponding to the network address should be associated with a second VRF instance, wherein the network controller is an OpenFlow controller and the reroute path and the policy-based routing rule are received according to an OpenFlow protocol;
   store the reroute path in the memory using a second routing table, the second routing table being associated with the second VRF instance: and
   disassociate the network address from the first VRF instance and associate the network address with the second VRF instance, when the network failure associated with the first VRF instance is detected.

9. The information handling system of claim 8, wherein one or more additional network devices are coupled in between the first network device and the second and third network devices.

10. The information handling system of claim 8, wherein the network address of the first network device is a network prefix.

11. The information handling system of claim 8, wherein the second VRF instance is a reroute VRF instance that is used during the network failure.

12. The information handling system of claim 8, further comprising:
   a bidirectional failure detection module the bidirectional failure detection module configured to detect a beginning of the network failure, the network failure occurring adjacent to the fourth network device; and
   a policy-based routing module provided by the one or more processors, the policy-based routing module being configured to:
   apply the policy-based routing rule.

13. The information handling system of claim 8, wherein the reroute path is determined by a network controller and communicated to a network agent running on the one or more processors of the fourth network device before a beginning of the network failure.

14. A method for rerouting network traffic through an information handling system in response to a network event, the method comprising:
   receiving, from a network controller and prior to the network failure, a reroute path and a policy-based routing rule indicating that the traffic corresponding to the network address should be associated with a second VRF instance, wherein the network controller is an OpenFlow controller and the reroute path and the policy-based routing rule are received according to an OpenFlow protocol;
   detecting the network failure adjacent to a network device along a normal-condition path through the information handling system; and associating one or more network addresses along with the normal-condition path with a first virtual routing and forwarding (VRF) instance prior to the network event and with a second VRF instance directing traffic along the reroute path thereafter.

15. The method of claim 14, further comprising: detecting an end of the network failure;
    disassociating the one or more network addresses from the second VRF instance; and
    returning traffic associated with the one or more network addresses to the normal-condition path.

16. The method of claim 14, wherein detecting the network failure is performed according to a bidirectional forwarding detection protocol.

17. The method of claim 14, further comprising:
    applying a set of the policy-based routing rules.

18. The method of claim 14, wherein the reroute path includes one or more network devices, each of the one or more network devices in the reroute path having a representation of the reroute path in memory.

19. The method of claim 14, further comprising providing, to the network controller and prior to the network failure, topology information that is used by the network controller to compute the reroute path.

* * * * *